(12) United States Patent
Simha et al.

(10) Patent No.: US 7,146,457 B2
(45) Date of Patent: Dec. 5, 2006

(54) CONTENT ADDRESSABLE MEMORY SELECTIVELY ADDRESSABLE IN A PHYSICAL ADDRESS MODE AND A VIRTUAL ADDRESS MODE

(75) Inventors: Kuldeep Simha, Fort Collins, CO (US); Reid J. Riedlinger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 10/669,519

(22) Filed: Sep. 24, 2003

(65) Prior Publication Data

US 2005/0066115 A1  Mar. 24, 2005

(51) Int. Cl.
*G06F 12/06* (2006.01)
*G06F 12/08* (2006.01)

(52) U.S. Cl. .................. 711/108; 711/1; 711/200; 711/215

(58) Field of Classification Search .................. 711/108
See application file for complete search history.

(56) References Cited

U.S. PATENT DOCUMENTS

| | | | |
|---|---|---|---|
| 4,723,224 A | 2/1988 | Van Hulett et al. | |
| 5,053,951 A | 10/1991 | Nusinov et al. | |
| 5,321,836 A | 6/1994 | Crawford et al. | |
| 5,383,146 A | * 1/1995 | Threewitt | ..................... 365/49 |
| 5,752,260 A | 5/1998 | Liu | |
| 5,946,716 A | 8/1999 | Karp et al. | |
| 6,012,133 A | 1/2000 | Shadan et al. | |
| 6,014,732 A | 1/2000 | Naffziger | |
| 6,026,476 A | 2/2000 | Rosen | |
| 6,330,177 B1 | 12/2001 | Johansson | |
| 6,446,187 B1 | 9/2002 | Riedlinger et al. | |
| 6,487,101 B1 | 11/2002 | Ashbrook et al. | |
| 6,493,790 B1 | * 12/2002 | Khieu et al. | ................. 711/108 |
| 6,493,792 B1 | 12/2002 | Undy et al. | |
| 6,493,812 B1 | 12/2002 | Lyon | |
| 6,539,457 B1 | 3/2003 | Mulla et al. | |
| 6,560,689 B1 | 5/2003 | Mathews et al. | |

OTHER PUBLICATIONS

Copy of UK Search Report for application No. GB0421203.1 conducted on Jan. 31, 2005 by Examiner Rich Corken for claims 1-9.

* cited by examiner

*Primary Examiner*—B. James Peikari

(57) ABSTRACT

Systems and methods are provided for searching at least one content addressable memory entry associated with a content addressable memory (CAM). A given content addressable memory entry comprises a plurality of CAM fields. At least one input selector controls access to the plurality of CAM fields, such that retrieval of a subset of the plurality of CAM fields is selectively enabled. A match evaluator compares an enabled subset of CAM fields to a search value.

21 Claims, 4 Drawing Sheets

CONTENT ADDRESSABLE MEMORY SELECTIVELY ADDRESSABLE IN A PHYSICAL ADDRESS MODE AND A VIRTUAL ADDRESS MODE

BACKGROUND

The composition of memory components in modern computing systems reflects a trade-off between speed, bulk, and capacity for a given level of expense. For example, the main memory of a computer system is generally a variety of dynamic random access memory. A chip, or stick, of dynamic random access memory provides a moderate amount of storage capacity (e.g., hundreds of Megabytes) in a fairly compact arrangement. This memory can be accessed fairly quickly by a central processor, on the order of a hundred nanoseconds. In contrast, a disk drive, such as a local hard disk drive, has a significantly larger capacity (e.g., hundreds of Gigabytes), but the access time for a given hard disk can be an order of magnitude higher than that of an associated main memory component.

To maximize the speed of information retrieval, modern computers generally rely on a hierarchy of memory ranging from small, low access time solid state memory components to high capacity, but comparatively slow, disk drives. For example, a processor can have one or more associated caches that have extremely low access times and similarly limited capacities. Data that has been recently accessed are placed in the cache from main memory and accessed from that location when needed. This allows the processor to avoid accessing the slower main memory when data is available in the cache.

A cache can have multiple levels, with successive levels having a larger capacity, but requiring a greater amount of time to access. In certain multi-level cache systems, the processor first accesses an index associated with the cache having the lowest access time and capacity, referred to as a first level cache, to determine if the desired data is located in the cache. This index can comprise a content addressable memory, a type of memory storage that includes bit-level comparison logic to facilitate rapid searching of the memory. If the desired data is available at the first level of the cache (e.g., the search results in a "hit"), an associated location is retrieved from the index, and the desired information is retrieved. If the desired data is not found, (e.g., the search results in a "miss"), the system searches storage components associated with lower levels of the memory hierarchy for the desired data.

SUMMARY

Systems and methods for searching at least one content addressable memory entry associated with a content addressable memory (CAM) are described. In one embodiment, a given content addressable memory entry comprises a plurality of CAM fields. At least one input selector controls access to the plurality of CAM fields, such that retrieval of a subset of the plurality of CAM fields is selectively enabled. A match evaluator compares an enabled subset of CAM fields to a search value.

A translation look-aside buffer assembly is also described. The translation look-aside buffer assembly may comprise a first set of memory storage cells associated with a first field and a second set of memory storage cells associated with a second field. The translation look-aside buffer assembly may include at least one input selector that selects between the first and second set of memory storage cells to provide one of the first field and the second field.

DETAILED DESCRIPTION

Systems and methods are provided for searching a content addressable memory (CAM). A content addressable memory system includes at least one memory entry. A given memory entry comprises a plurality of CAM fields. For example, CAM fields can include physical address fields, virtual address fields, region identification fields, and other such data fields. The systems and methods employ an input selector to select among the various CAM fields, such that access to a subset of the CAM fields is enabled, while access to the remaining CAM fields is restricted. Comparison logic, in the form of a match evaluator, compares the enabled subset of CAM fields to a search value. As fewer CAM fields are evaluated at a given time, the complexity of the comparison logic can be reduced, resulting in an overall savings of power consumption and chip space.

Figure 1:
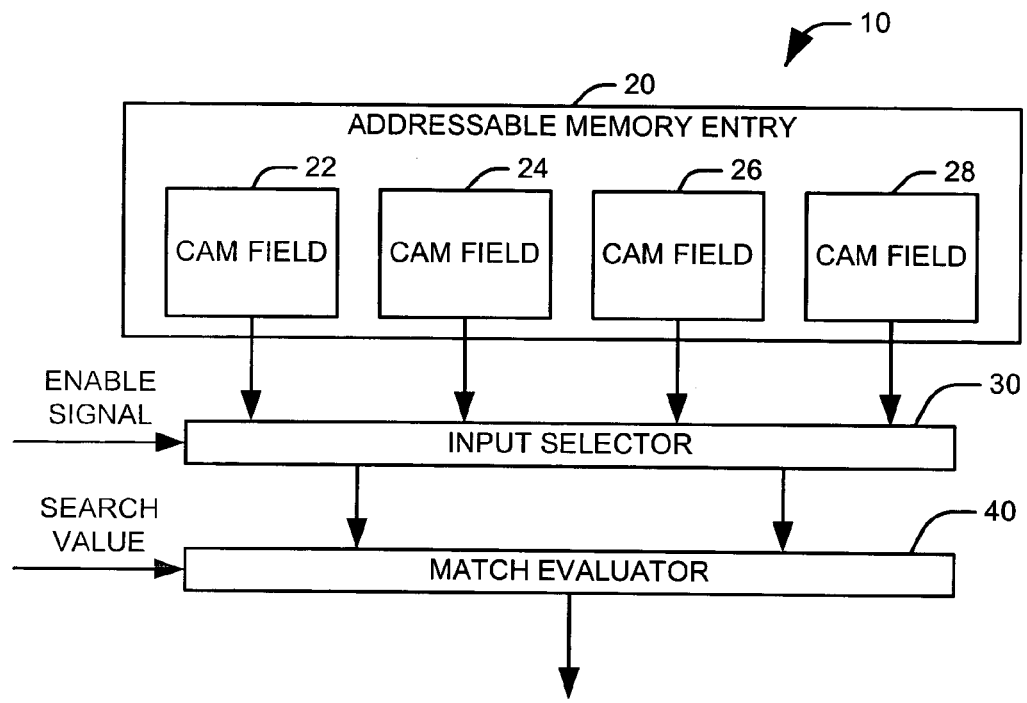
FIG. 1 illustrates a functional block diagram of a system for searching a content addressable memory.

FIG. 1 illustrates a functional block diagram of a system 10 for searching one or more memory entries within a content addressable memory for a given search value. The illustrated system comprises one memory entry 20, an input selector 30, and a match evaluator 40. A content addressable memory is a type of data storage device that includes comparison logic within its storage medium. A content addressable memory system can contain one or more entries, with a given entry being operative to be compared bit-by-bit to an input search value. A memory entry 20 can represent a memory address for a particular block or page of data. For example, a memory entry 20 can comprise a physical address, a virtual address, a region identifier, and similar data associated with a block of data.

The memory entry 20 comprises a plurality of CAM fields 22–28. A given CAM field contains a discrete number of bits from a memory address associated with the entry. The input selector 30 selects one or more CAM fields among the plurality of CAM fields (22–28) and enables the comparison logic within the match evaluator 40 to access the selected CAM fields. The input selector 30 can comprise one or more selection components operative to selectively enable access from the search logic to the plurality of memory portions 22–28.

The match evaluator 40 compares the selected one or more CAM fields to a given search value. The match evaluator can comprise one or more logic components appropriate for comparing digital logic signals. If the selected CAM fields within an entry match the given search value, the match evaluator 40 outputs a signal (e.g., a logic high or a logic low) indicating a match. Further information can be retrieved, either consecutively or concurrently, from the content addressable memory in accordance with the match result.

Figure 2:
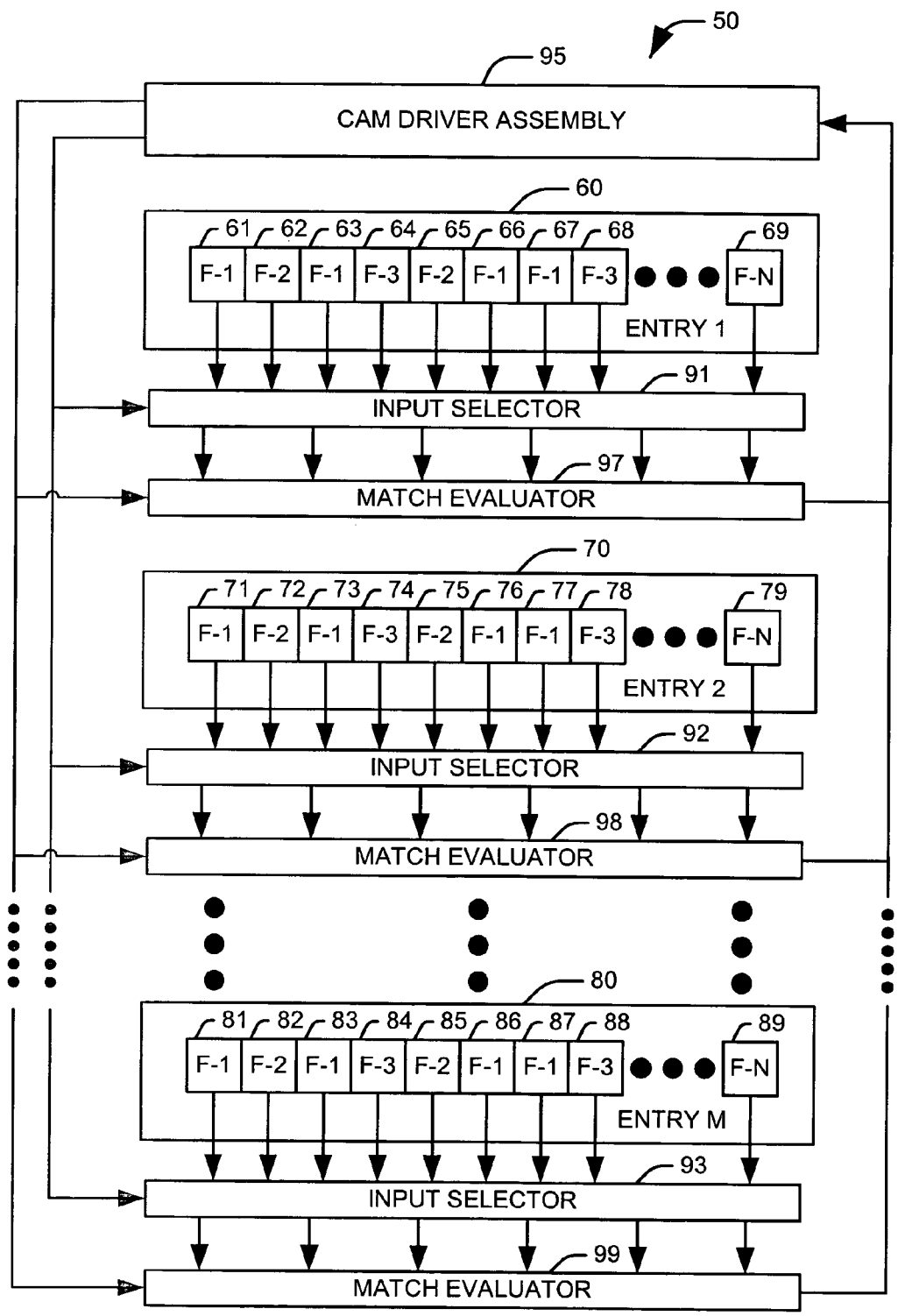
FIG. 2 illustrates a functional block diagram of a content addressable memory system.

FIG. 2 illustrates a functional block diagram of a content addressable memory (CAM) system 50. The system 50 provides for an efficient search of a plurality of addressable memory entries 60, 70, and 80 for a desired string of data. A given memory entry comprises a respective plurality of data storage units 61–69, 71–79, and 81–89. The CAM system 50 can store multiple types, or fields, of data. Accordingly, a plurality of data storage units (e.g., 61–69) associated with a given memory entry (e.g., 60) can be divided among a plurality of data fields, with at least one of the data storage units being associated with a respective one of the plurality of data fields. A data storage unit (e.g., 61) can comprise a variety of suitable digital circuitry for storing one or more bits of data. For example, a data storage unit (e.g., 61) can comprise one or more capacitors, one or more switches (e.g., transistors), or similar digital circuitry.

It will be appreciated that the association of the various data storage units with the plurality of data fields does not imply a corresponding physical ordering in a given memory entry. For example, if a plurality of data storage units (e.g., 61, 63, 66, and 67) are associated with a first data field, the associated data storage units can be ordered within the entry (e.g., 60) as to be interleaved with data storage units associated with one or more other fields (e.g., 62, 64, 65, 68, and 69). It will further be appreciated that in some applications, one or more data storage units can be associated with multiple fields, such that the association is fluid over time. For example, in an application in which the size of the units of memory indexed by the CAM system 50 is variable, the association of one or more storage units can change from a first field to a second field according to the size of the indexed memory unit.

In the illustrated example, the memory entries 60, 70, and 80 have respective input selectors 91, 92, and 93. A given input selector (e.g., 91) can comprise one or more selection components that select a subset of the plurality of data fields. In other words, the respective input selector (e.g., 91) of a memory entry (e.g., 60) is operative to select at least one, but not all, of the plurality of data fields. The input selectors 91, 92, and 93 receive a control signal from a CAM driver assembly 95 that instructs the input selector to select data storage units associated with the selected subset of fields. An input selector (e.g., 91) can comprise a variety of devices useful for enabling selection among a plurality of fields, such as one or more multiplexers, one or more switches, or other digital circuitry.

Data from the selected field is read by respective match evaluators 97, 98, and 99 at the memory entries 60, 70, and 80. A given match evaluator (e.g., 97) can comprise a variety of components useful for comparing digital signals. For example, a match evaluator (e.g., 97) associated with a given memory entry (e.g., 60) can comprise one or more switches, one or more logic devices, or other digital circuitry. A match evaluator (e.g., 97) compares the stored data to a desired data string provided by the CAM driver assembly 95. A match evaluator (e.g., 97) provides a signal to the CAM driver assembly 95 indicating whether the data read from the selected data storage units matches the desired data string. For example, the match evaluator (e.g., 97) can provide a digital logic high signal to the CAM driver 95 when a match is detected. The output of the match evaluators 97, 98, and 99 can be provided to the CAM driver assembly 95 as an M-bit vector, where M is the number of memory entries in the CAM system 50. A logic high on one bit of the vector indicates a "hit" or match in the corresponding entry. A logic low across the entire vector indicates a "miss", meaning that the desired data string is not in the cache.

Figure 3:
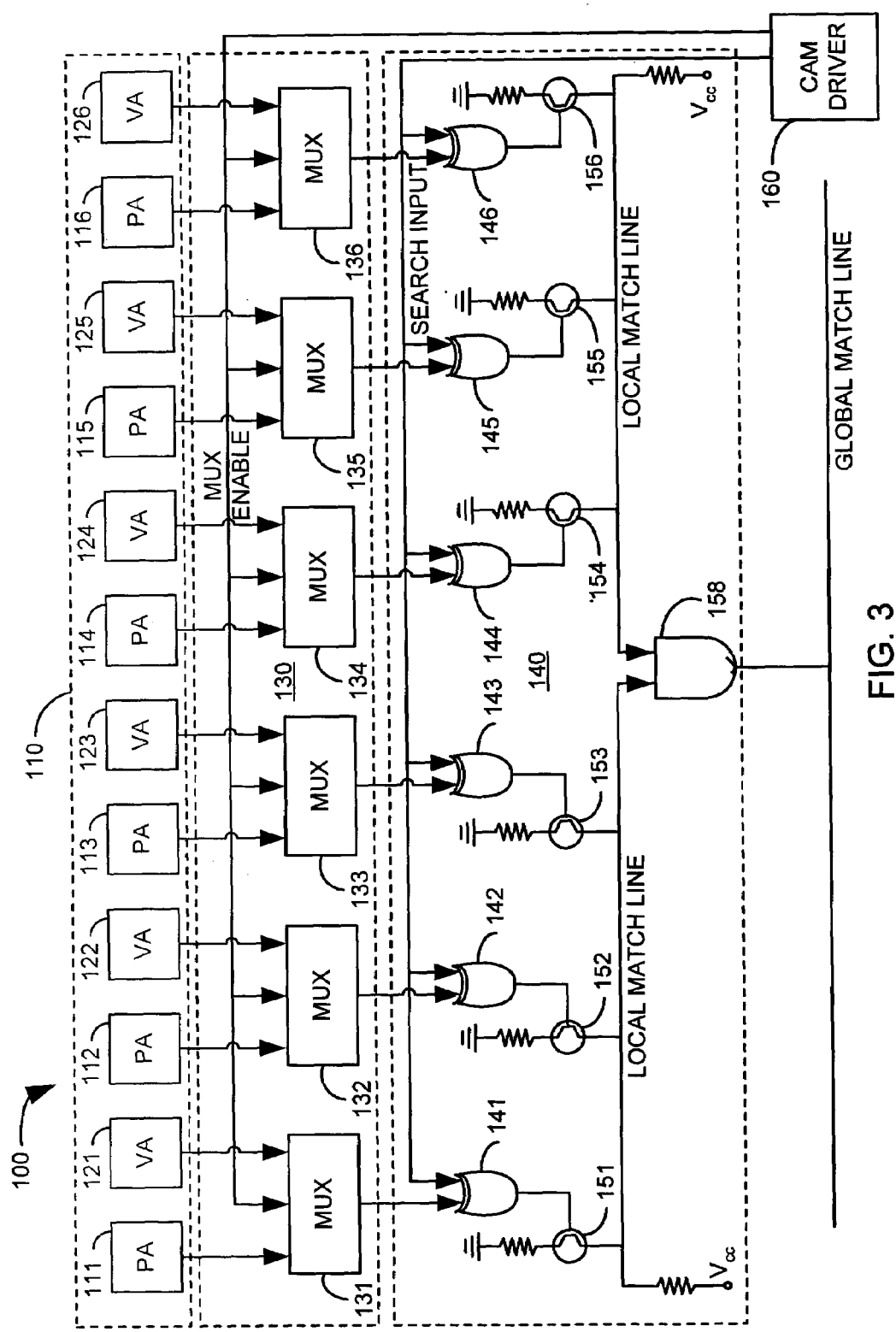
FIG. 3 illustrates a functional block diagram of an exemplary twelve-bit section of a translation look-aside buffer for a computer cache memory.

FIG. 3 illustrates a functional block diagram of an exemplary twelve-bit section 100 of a translation look-aside buffer (TLB) for a computer cache memory. The TLB comprises at least two fields, a physical address (PA) field and a virtual address (VA) field. The TLB can be implemented in a variety of ways. In the illustrated example, the TLB can be implemented as complementary metal-oxide semiconductor (CMOS) circuitry on an integrated circuit chip. The illustrated twelve-bit section 100 of the TLB comprises a memory entry 110, an associated input selector 130, an associated match evaluator 140, and a content addressable memory (CAM) driver 160. It will be appreciated that the TLB can comprise multiple twelve-bit sections, and that the CAM driver 160 can represent a common CAM driver for the plurality of twelve-bit sections. The illustrated input selector 130 and the illustrated match evaluator 140 can represent portions of a larger input selector assembly and a larger match evaluator common to the multiple twelve-bit sections within the TLB.

The memory entry 110 comprises a plurality of data storage components 111–116 and 121–126. The data storage components can be implemented as an appropriate computer memory, such as static random access memory, flash memory, or dynamic random access memory. A number of the data storage components 111–116 are associated with the physical memory field, and the remaining components 121–126 are associated with the virtual memory field. It will be appreciated that the illustrated portion 100 of the TLB has been simplified for the purposes of illustration. For example, the memory entry 110 can comprise additional associated fields, such as a valid bit field and one or more fields related to memory region identification. Further, a given data storage component (e.g., 111) can have multiple associated fields in some applications.

The input selector 130 comprises a plurality of multiplexers 131–136. A given multiplexer (e.g., 131) is operatively connected to a pair of data storage units (e.g., 111 and 121), one associated with each field. The multiplexers 131–136 select between the two fields according to a common MUX enable signal from the CAM driver 160, such that data associated with the selected fields is made available during a search of the TLB. The enable signal instructs the multiplexers 131–136 to assume either a physical address mode, in which the multiplexers 131–136 select the data storage units 111–116 associated with the physical address, or a virtual address mode, in which the multiplexers select the data storage units 121–126 associated with the virtual address.

Data bits from the selected data storage units (e.g., 111–116) are provided to the match evaluator 140. The match evaluator 140 comprises a plurality of XOR gates 141–146 corresponding to the plurality of multiplexers 131–136. A given XOR gate (e.g. 141) receives a first input from its corresponding multiplexer (e.g., 131). A second input is provided by the CAM driver 160 as a search input value. The search input value includes a bit corresponding to each data bit provided at the multiplexers 131–136. For a given XOR gate (e.g., 141), a logic low value is produced when the logical value provided by a multiplexer (e.g., 131) matches the search input. Thus, a logic high value output from an XOR gate (e.g., 141) indicates that the data output from the multiplexer does not match its corresponding search input value at that gate. Each XOR gate can be comprised of a pair of pass gates with a search input bit coupled to an input of a first pass gate and the complement of the search input bit coupled to an input of a second pass gate. The selected data bit can enable one of the pass gates to provide the desired XOR gate functionality based on whether or not a match occurs between the search input bit and the data bit.

The output of the XOR gates 141–146 provide a gating input to respective pull-down field effect transistors (FETs) 151–156. The match evaluator 140 includes two local match lines that connect respective voltage sources to a central AND gate 158. A given pull-down FET (e.g., 151) connects an associated local line to a ground voltage, with a given local line having three associated pull-down FETs. If a XOR gate (e.g., 141) produces a logic high signal (e.g., a data bit from a multiplexer fails to match its associated search value), its associated FET (e.g., 151) will be enabled. An enabled FET (e.g., 151) provides a direct connection between its associated local match line and ground, providing a logic low to the AND gate 158. Thus, a given local match line will only provide a voltage high to the AND gate 158 if every bit output by the multiplexers associated with that line matches the search value. The employment of multiplexers 131–136 eliminates the need for separate XOR gates for both the physical address bits and the virtual address bits, thus saving chip space and mitigating power consumption.

The AND gate 158 is operatively connected to the two local match lines for its two inputs. As will be appreciated, the AND gate 158 will only provide a logic high when both of the local match lines are isolated from the ground voltage (e.g., the local match lines provided a voltage high). Accordingly, the AND gate 158 will provide a voltage high only when all bits from the selected field matches the search input. The output of the AND gate is provided to a global line that connects the twelve-bit section 100 with at least one other twelve-bit section. The global line can include match evaluation mechanisms, such as the described pull-down FETs and AND gates, to determine which of the plurality of twelve-bit sections within the TLB have registered a match.

Figure 4:
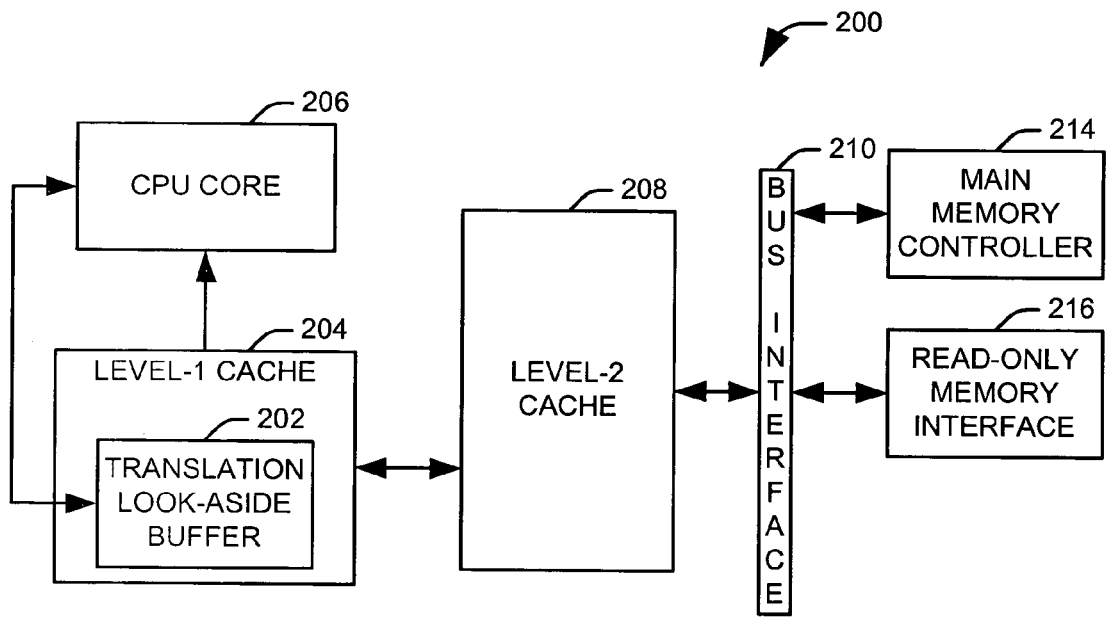
FIG. 4 illustrates an exemplary processor assembly in which a selectable content addressable memory can be implemented.

FIG. 4 illustrates an exemplary processor assembly 200 in which a selectable content addressable memory (CAM) 202 can be implemented. The selectable CAM comprises a plurality of memory entries, each having a plurality of associated CAM fields. For example, CAM fields can include physical address fields, virtual address fields, region identification fields, and other such data fields. The selectable CAM includes an input selector to select among the various CAM fields, such that access to a subset of the CAM fields is enabled, while access to the remaining CAM fields is restricted. Comparison logic within the selectable CAM compares the enabled subset of CAM fields to a search value to determine if the desired value is present in the CAM.

In the illustrated example, the selectable content addressable memory 202 is associated with a unified level-1 cache 204 (e.g., a cache directly connected to the processor). It will be appreciated, however, that a content addressable memory can be associated with one or more split caches within a processor assembly (e.g., a data cache and an instruction cache), or with a lower level cache (e.g., a level-2 or a level-3 cache).

A central processing unit (CPU) core 206 provides a virtual address representing desired information to the selectable CAM 202. The selectable CAM 202 determines if the provided virtual address matches a stored value. A match indicates that the desired value is available in the level-1 cache 204. If a match is indicated, a physical address related to the given virtual address is provided by the selectable CAM 202. Data is retrieved from the indicated address within the level-1 cache 204 and provided to the CPU core 206 for processing.

If the desired virtual address is not found in the selectable CAM 202, the desired address is passed along to a level-2 cache 208. A content addressable memory index (not shown) associated with the level-2 cache 208 is searched for the desired address. If the address is found, the desired information is retrieved from the level-2 cache 208 at a corresponding physical address. This information can then be written to the level-1 cache 204, replacing an older entry, and provided to the CPU core 206.

If the desired virtual address is not found at the level-2 cache 208, the address is provided to a bus interface 210. The bus interface 210 connects "on-chip" resources, such as the level-1 cache 204 and the level-2 cache 208 with one or more off-site memory components. For example, these components can include a main memory controller 214 and a read-only memory interface 216. The off-site components (e.g., 214) can be searched for the desired address. When the address is finally located, information associated with the address can be provided to the level-1 cache 204 and the level-2 cache 208 as an updated memory entry. The information is then provided to the CPU core 206 for processing.

Figure 5:
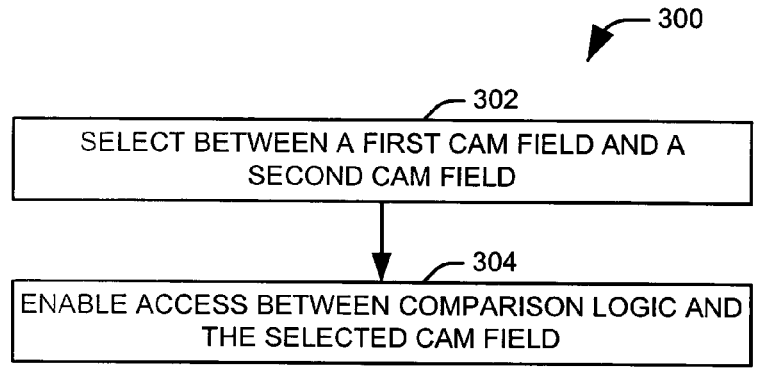
FIG. 5 illustrates a methodology for changing a search mode associated with a content addressable memory system.
Figure 6:
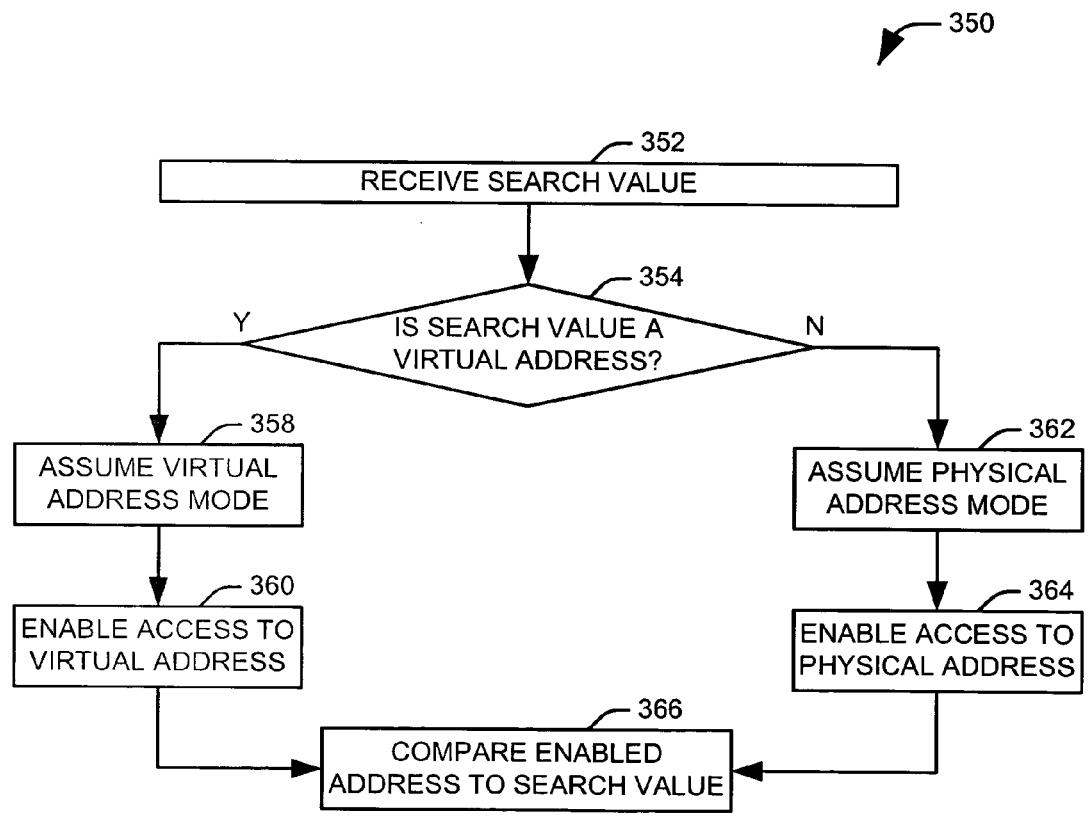
FIG. 6 illustrates an exemplary methodology for searching a content addressable memory.

In view of the foregoing structural and functional features described above, methodologies will be better appreciated with reference to FIGS. 5 and 6. While, for purposes of simplicity of explanation, the methodology embodiments of FIGS. 5 and 6 are shown and described as being implemented serially, it is to be understood and appreciated that other embodiments of these methodologies are not limited to the illustrated order, as some aspects could, in accordance with some embodiments of present invention, occur in different orders and/or concurrently with other aspects from that shown and described. Moreover, not all illustrated features may be required to implement a methodology. It is to be further understood that the following methodology can be implemented in hardware, software (e.g., computer executable instructions), or any combination thereof.

FIG. 5 illustrates a methodology 300 for selecting a search mode associated with a content addressable memory system. For ease of illustration, the methodology 300 is described as selecting between a first mode and a second mode. It will be appreciated, however, that a content addressable memory system can have more than two associated modes, and that the selection of the illustrated methodology can be expanded to encompass a selection between the more than two modes.

The methodology begins at 302 where the content addressable memory (CAM) system selects a subset of CAM fields from a plurality of CAM fields. The selected CAM fields define the instant mode of the content addressable memory system. For example, a first mode can be associated with the selection of a first CAM field, while a second mode can be associated with the selection of a CAM second field. At least one CAM field, however, will not be selected for each mode.

At 304, access is enabled between comparison logic associated with the CAM and the selected CAM fields. This allows the selected CAM fields to be read by the comparison logic, while disabling access to one or more CAM fields that are not selected in a particular mode. It will be appreciated that one or more CAM fields can be unaffected by a change in mode, such that they are either always enabled or always disabled. It will be appreciated, however, that a given mode will disable at least one CAM field. Once the proper CAM fields have been enabled, the mode of the CAM has been successful changed, and the selected CAM fields can be searched.

FIG. 6 illustrates an exemplary methodology 350 for searching a content addressable memory (CAM). The CAM comprises one or more entries, with a given CAM entry including a plurality of CAM fields. In the exemplary methodology, the CAM comprises at least one CAM field related to a virtual address and one CAM field related to a physical address. For ease of illustration, the methodology 300 is illustrated as selecting between a virtual address mode and a physical address mode. It will be appreciated, however, that a content addressable memory system can have more than two associated modes, and that the selection of the illustrated methodology 300 can be expanded to encompass a selection among the more than two modes.

The methodology 350 begins at 352, where a search value is received at the CAM. The search value can represent a desired data string associated with a physical address or a virtual address. At 354, it is determined if the search value represents a virtual address. For example, an enable signal can be provided with the search value to indicate the nature of the search value. If the search value represents a virtual address, the methodology 350 advances to 358, where the CAM assumes a virtual address mode. At 360, access is enabled to the one or more CAM fields within the CAM that are associated with the virtual address. The enabled CAM fields are thus made available to comparison logic associated with the CAM, while non-enabled CAM fields (e.g., the one or more CAM fields associated with the physical address) are not made available. It will be appreciated that the assumption of a virtual mode at 358 and the enablement of the virtual CAM fields within the CAM can occur in an interchangeable order or even simultaneously.

It will further be appreciated that one or more other CAM fields might become enabled or remain enabled when the CAM assumes a virtual mode at 358. These CAM fields can include CAM fields for region identification, valid or clean bits within the recorded address, and similar address data suitable for storage in a content addressable memory. The one or more CAM fields associated with the physical memory, however, will not be enabled in virtual mode. Thus, the CAM effectively selects between the virtual address and the physical address when a mode is selected.

If the provided search value does not represent a virtual address, the methodology 350 advances to 362, where the CAM assumes a physical address mode. At 364, access is enabled to the one or more CAM fields within the CAM that are associated with the physical address. The enabled CAM fields are thus made available to comparison logic associated with the CAM, while the non-enabled CAM fields (e.g., the one or more CAM fields associated with the physical address) are not made available. It will be appreciated that the assumption of a physical mode at step 362 and the enablement of the one or more physical CAM fields within the CAM can occur in an interchangeable order or even simultaneously. As above, other CAM fields, unassociated with the physical address, can be enabled in physical address mode, but the one or more CAM fields associated with the virtual address will not be enabled.

Once the appropriate CAM fields have been enabled, the methodology 350 advances to 366. At 366, the enabled CAM fields are compared to the search value. If the comparison indicates a match, a signal indicating the position of a matching entry can be provided to a controller, such as a memory driver or the processor. If no match is indicated, a negative result is returned, and another memory is searched for the desired address.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A content addressable memory (CAM) system comprising:
    at least one CAM entry comprising a plurality of CAM fields, the plurality of CAM fields comprising a first field and a second field, the first field being associated with a physical address and the second field being associated with a virtual address;
    at least one input selector that enables access to the physical address mode and the second field in a virtual address mode; and
    a match evaluator that compares the enabled field to a search value.

2. The system of claim 1, at least one of the first field and the second field is interleaved with at least one other of the plurality of CAM fields.

3. The system of claim 1, the match evaluator comprising at least one pull-down field effect transistor.

4. The system of claim 1, the at least one input selector comprising at least one multiplexer.

5. The system of claim 1, further comprising a driver that provides a control input to the input selector and provides a given search value to the match evaluator.

6. A memory cache system comprising the system of claim 1.

7. A processor assembly comprising the memory cache system of claim 6.

8. The system of claim 1, the CAM system being a translation look-aside buffer.

9. The system of claim 1, wherein the CAM entry comprises a plurality of storage units, at least one of the plurality of storage units being associated with both the first field and the second field.

10. A method for selecting a search mode associated with a content addressable memory system (CAM), the method comprising:
    selecting between a virtual address mode and a physical address mode;
    enabling access to a stored physical address associated with the CAM if the physical address mode is selected;
    enabling access to a stored virtual address associated with the CAM if the virtual address mode is selected; and
    comparing the enabled address to a search value.

11. The method of claim 10, the selecting comprising configuring a plurality of multiplexers with a common enable signal to one of a virtual address mode and a physical address mode.

12. The method of claim 10, the comparing of the enabled address to a search value comprising driving a pull-down field effect transistor (FET) with an exclusive-OR (XOR) gate receiving respective bits of the enabled address and the search value.

13. The method of claim 10, the CAM system being a translation look-aside buffer.

14. A method of searching a content addressable memory (CAM) comprising:
  selecting a first CAM field from a memory entry in a physical address mode and a second CAM field from the memory entry in a virtual address mode, the first CAM field comprising a physical address and the second CAM field comprising a virtual address; and
  enabling access between comparison logic associated with the CAM and the selected one of the first CAM field and the second CAM field.

15. The method of claim 14, the selecting one of the first CAM field and the second CAM field comprising providing a control signal that has a first state in the physical address mode and a second state in the virtual address mode to one or more input selectors.

16. The method of claim 14, the CAM system being a translation look-aside buffer.

17. The method of claim 14, further comprising interleaving the first CAM field in the memory entry with the second CAM field in the memory entry.

18. The method of claim 14, wherein each memory entry comprises a plurality of storage units, at least one of the plurality of storage units being associated with both the first CAM field and the second CAM field.

19. A system for searching a content accessible memory (CAM), comprising:
  means for selectively enabling access to a stored physical address associated with a first CAM field if a physical address mode is selected and a stored virtual address associated with a second CAM field if a virtual address mode is selected; and
  means for comparing the selectively enabled CAM field to a search value.

20. The system of claim 19, further comprising means for providing a control signal to the means for selectively enabling, the control signal having a first state in the physical address mode and a second state in the virtual address mode.

21. The system of claim 19, the CAM system being a translation look-aside buffer.

* * * * *

UNITED STATES PATENT AND TRADEMARK OFFICE
CERTIFICATE OF CORRECTION

PATENT NO. : 7,146,457 B2  Page 1 of 1
APPLICATION NO. : 10/669519
DATED : December 5, 2006
INVENTOR(S) : Kuldeep Simha et al.

It is certified that error appears in the above-identified patent and that said Letters Patent is hereby corrected as shown below:

In column 8, line 22, in Claim 1, after "the" insert -- first field in a --.

In column 10, line 3, in Claim 19, delete "accessible" and insert -- addressable --, therefor.

Signed and Sealed this

Sixteenth Day of December, 2008

JON W. DUDAS
*Director of the United States Patent and Trademark Office*